(12) United States Patent
Park

(10) Patent No.: US 12,396,825 B2
(45) Date of Patent: Aug. 26, 2025

(54) FIXTURE OF DENTAL IMPLANT

(71) Applicant: MEGAGEN IMPLANT CO., LTD., Daegu (KR)

(72) Inventor: Kwang Bum Park, Daegu (KR)

(73) Assignee: MEGAGEN IMPLANT CO., LTD., Daegu (KR)

(*) Notice: Subject to any disclaimer, the term of this patent is extended or adjusted under 35 U.S.C. 154(b) by 483 days.

(21) Appl. No.: 16/769,812

(22) PCT Filed: Nov. 12, 2018

(86) PCT No.: PCT/KR2018/013727
§ 371 (c)(1),
(2) Date: Jun. 4, 2020

(87) PCT Pub. No.: WO2019/112195
PCT Pub. Date: Jun. 13, 2019

(65) Prior Publication Data
US 2020/0367997 A1    Nov. 26, 2020

(30) Foreign Application Priority Data

Dec. 4, 2017    (KR) .................. 10-2017-0164968

(51) Int. Cl.
*A61C 8/00*    (2006.01)
(52) U.S. Cl.
CPC ............ *A61C 8/0022* (2013.01); *A61C 8/006* (2013.01); *A61C 8/0069* (2013.01)
(58) Field of Classification Search
CPC ..... A61C 8/0022; A61C 8/006; A61C 8/0069; A61C 8/0001; A61C 8/0025;
(Continued)

(56) References Cited

U.S. PATENT DOCUMENTS

| 7,338,286 B2 | 3/2008 | Porter et al. |
| 9,770,312 B2 | 9/2017 | Guenter et al. |

(Continued)

FOREIGN PATENT DOCUMENTS

| EA | 27844 B1 | 9/2017 |
| JP | 2004283552 A | 10/2004 |

(Continued)

OTHER PUBLICATIONS

Translation for JP 2013078428 (Year: 2013).*

(Continued)

*Primary Examiner* — Eric J Rosen
*Assistant Examiner* — Mirayda A Aponte
(74) *Attorney, Agent, or Firm* — CALDERON SAFRAN & WRIGHT P.C.

(57) ABSTRACT

Disclosed is an implant fixture. The fixture of a dental implant according to the present invention includes a fixture body in which a screw portion is formed in a spiral shape along an outer wall and an abutment insertion groove inserted with an abutment is recessed in a longitudinal direction at an upper end, an abutment rotation stopping portion which is formed in a shape in which at least a part of the inner wall of the fixture body is shape-fitted to the outer wall of the abutment and stops a relative rotation to the fixture body of the abutment, and a tool coupling portion which is provided in the fixture body adjacently to the abutment rotation stopping portion in an upper region of the abutment rotation stopping portion and detachably coupled with a rotary tool rotating the fixture body.

6 Claims, 14 Drawing Sheets

(58) Field of Classification Search
CPC ..... A61C 8/0068; A61C 8/008; A61C 8/0083; A61C 8/0087; A61C 8/0048; A61C 8/0089; Y10T 29/49567
USPC ...................................... 433/201.1, 174–176
See application file for complete search history.

(56) References Cited

U.S. PATENT DOCUMENTS

| | | |
|---|---|---|
| 10,350,033 B2 | 7/2019 | Bugnard et al. |
| 2008/0096168 A1 | 4/2008 | Schonenberger |

FOREIGN PATENT DOCUMENTS

| | | | | |
|---|---|---|---|---|
| JP | 2013502959 A | | 1/2013 | |
| JP | 2013078428 A | * | 5/2013 | |
| JP | 2016523626 A | | 8/2016 | |
| KR | 20110122260 A | | 11/2011 | |
| KR | 20120005575 U | | 8/2012 | |
| KR | 20120106427 A | | 9/2012 | |
| KR | 20140088301 A | | 7/2014 | |
| KR | 20160018578 A | | 2/2016 | |
| KR | 20160033019 A | | 3/2016 | |
| RU | 161879 U1 | | 5/2016 | |
| RU | 2615078 C2 | | 4/2017 | |
| TW | I362255 B1 | | 4/2012 | |
| WO | WO-2006019224 A1 | * | 2/2006 | ........... A61C 8/0066 |
| WO | 2011023750 A2 | | 3/2011 | |
| WO | 2012085039 A1 | | 6/2012 | |
| WO | WO-2014185264 A1 | * | 11/2014 | ........... A61C 8/0089 |
| WO | 2014198682 A1 | | 12/2014 | |

OTHER PUBLICATIONS

Schonenberger, Tooth Implant, WO 2006047901 A1, partial translation (Year: 2008).*
Schonenberger, Tooth Implant, WO 2006047901 A1, Full machine translation of the specification (Year: 2008).*
European Office Action—Dec. 20, 2021—Related EP Application No. 18886621.4.
Russian Search Report—Feb. 3, 2021—Related RU Application No. 2020121474.
International Search Report—Corresponding Application PCT/KR2018/013727—Dated Jan. 30, 2019.

* cited by examiner

FIXTURE OF DENTAL IMPLANT

CROSS-REFERENCE TO RELATED APPLICATIONS AND CLAIM TO PRIORITY

This application is a national stage application of International Application No. PCT/KR2018/013727 filed Nov. 12, 2018, which claims priority to Korean Patent Application No. 10-2017-0164968 filed Dec. 4, 2017, the disclosures of which are incorporated herein by reference and to which priority is claimed.

FIELD OF THE INVENTION

The present invention relates to a fixture of a dental implant and more particularly, to a fixture of a dental implant capable of preventing the shaking of an abutment coupled to the fixture.

BACKGROUND OF THE INVENTION

An implant refers to a replacement that restores when an original tissue is lost, but refers to a series of treatments of implanting artificial teeth in the dentist.

In order to replace a lost dental root, a fixture, which is a dental root made of titanium or the like without a rejection reaction to the human body, is planted in the alveolar bone from which the tooth is removed, and then the artificial tooth is fixed to restore the function of the tooth.

In general prostheses or dentures, the surrounding teeth and bones are damaged over time, but there are advantages in that the implants do not injure the surrounding dental tissues and do not have cavities while having the same function and shape as the natural teeth and thus can be used semi-permanently.

An artificial tooth procedure (also referred to as an implant or an implant procedure) varies depending on the type of fixture, but it is general that the implant is completed by perforating a placement position using a predetermined drill, placing a fixture into the alveolar bone to be osseously integrated on the bone, coupling the abutment to the fixture, and then covering the abutment with a final prosthesis.

A dental implant improves the function of dentures in partial and total toothless patients as well as single absent-tooth restoration, improves the aesthetic aspects of dental prosthesis restoration, and helps to stabilize dentition while dispersing excessive stress applied to the surrounding supporting bone tissue.

Such a dental implant generally includes a fixture to be placed as an artificial dental root, an abutment coupled onto the fixture, an abutment screw to fix the abutment to the fixture, and an artificial tooth coupled to the abutment. Here, the abutment is coupled to the fixture to maintain the coupling state before the abutment is coupled to the fixture, that is, until the fixture is osseously integrated to the alveolar bone.

A fixture, which is a component of a dental implant, is a portion to be placed into a drill hole formed in the alveolar bone using a drill or the like at a position where the implant is performed, and serves as an artificial tooth root. A threaded portion is provided around the outer wall of the fixture in a helical shape for firm fixation of the fixture and the alveolar bone.

In addition, the fixture is provided with an abutment insertion groove which is formed by being recessed in the longitudinal direction at the upper end and inserted with the abutment.

In the inner wall of the abutment insertion groove, an abutment and tool-coupling portion is provided in a shape fitted to the outer wall of the abutment to prevent relative rotation with respect to the fixture on the abutment and detachably coupled with a rotary tool.

Such an abutment and tool-coupling portion performs a function of receiving the rotational power of the rotary tool at the time of placing the fixture by shape-fitting the inner wall to the outer walls of the abutment and the tool and a function of stopping the relative rotation with respect to the fixture of the abutment inserted into the abutment insertion groove.

In the fixture according to the related art, the inner wall of the abutment and tool-coupling portion is provided in a hexagonal shape in a circumferential direction of the fixture. Of course, the abutment is provided with an insertion portion having a shape in which the outer wall is shape-fitted into the inner wall of the abutment and tool-coupling portion.

As described above, according to the related art, the inner wall of the abutment and tool-coupling portion of the fixture and the outer wall of the insertion portion of the abutment are provided in a hexagonal shape. Due to the characteristic of the hexagonal shape, the inner wall of the abutment and tool-coupling portion of the fixture and the outer wall of the insertion portion of the abutment are not completely brought into close contact with each other, so that a minute spacing is formed between the inner wall of the abutment and tool-coupling portion of the fixture and the outer wall of the insertion portion of the abutment.

The shaking occurs in the abutment coupled to the fixture by the spacing, and the shaking of the abutment causes the damage to the abutment or the fixture.

In order to eliminate the shaking of the abutment, it is necessary to remove the spacing space between the inner wall of the abutment and tool-coupling portion of the fixture and the outer wall of the insertion portion of the abutment. In order to remove such a spacing, the shape of the inner wall of the abutment and tool-coupling portion of the fixture needs to be changed to a polygonal shape of a conventional hexagonal shape or more.

However, if the shape of the inner wall of the abutment and tool-coupling portion of the fixture is changed to the polygonal shape of a conventional hexagonal shape or more, there is a problem in that the torque of the rotary tool is not smoothly transmitted to the fixture.

That is, when the shape of the inner wall of the abutment and tool-coupling portion of the fixture is changed to the polygonal shape of the conventional hexagonal shape or more, the length of one side of the polygonal shape becomes shorter than the length of one side of the conventional hexagonal shape, so that there is a problem in that the torque of the rotary tool is not effectively transmitted to the fixture.

SUMMARY OF THE INVENTION

Technical Problem

Therefore, the present invention has been made in an effort to provide a fixture of a dental implant that can prevent the shaking of an abutment coupled to a fixture and effectively receive the torque of a rotary tool during a placing process of the fixture of a dental implant.

The embodiments of the present invention include the tool coupling portion which is disposed in the upper region of the abutment rotation stopping portion provided in a shape in which the inner wall is shape-fitted to the outer wall of the abutment and detachably coupled with the rotary tool rotating the fixture body. As a result, the shape of the abutment rotation stopping portion is not influenced by the shape of the rotary tool so that the shape of the inner wall of the abutment rotation stopping portion may be brought into close contact with the outer wall of the abutment. Therefore, it is possible to effectively receive the torque of the rotary tool at the time of placing the fixture of a dental implant while preventing shaking of the abutment coupled to the fixture body.

DETAILED DESCRIPTION OF THE PREFERRED EMBODIMENT(S)

Figure 1:
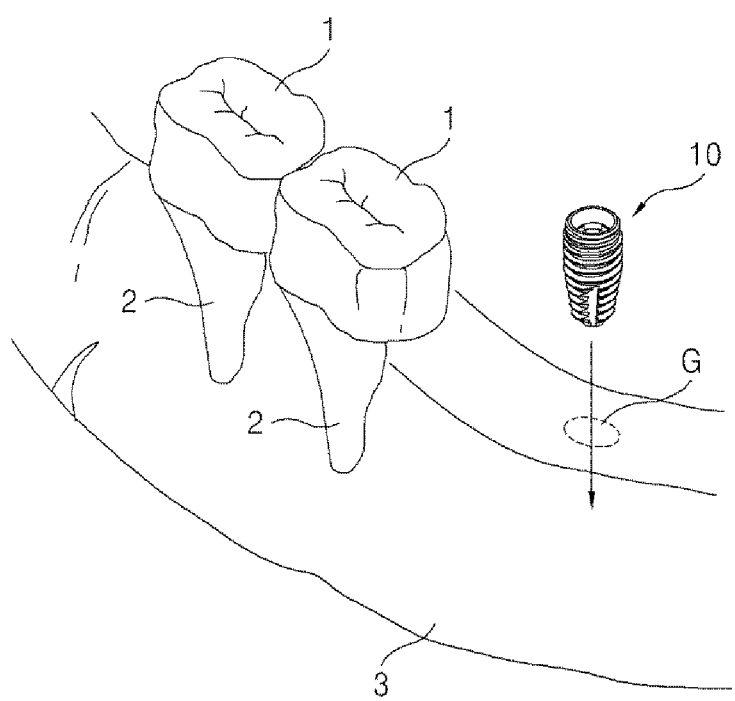
FIG. 1 is a diagram schematically illustrating a process of placing a fixture of a dental implant according to a first embodiment of the present invention.

According to an aspect of the present invention, there is provided a fixture of a dental implant including: a fixture body in which a screw portion is formed in a spiral shape along an outer wall and an abutment insertion groove inserted with an abutment is recessed in a longitudinal direction at an upper end; an abutment rotation stopping portion which is formed in a shape in which at least a part of the inner wall of the fixture body is shape-fitted to the outer wall of the abutment and stops a relative rotation to the fixture body of the abutment; and a tool coupling portion which is provided in the fixture body adjacently to the abutment rotation stopping portion in an upper region of the abutment rotation stopping portion and detachably coupled with a rotary tool rotating the fixture body.

The inner wall of the abutment rotation stopping portion may be formed in an octagonal shape in a circumferential direction of the fixture body.

The tool coupling portion may include a protrusion portion which is extended upward by a predetermine length from an edge region of the inner wall of the abutment rotation stopping portion; and a groove portion which is connected to the protrusion portion and recessed by a predetermined depth toward the outer wall of the fixture body in the inner wall of the protrusion portion.

A length of the protrusion portion in the circumferential direction of the fixture body may be smaller than a length of one side of an octagonal shape formed by the inner wall of the abutment rotation stopping portion.

Four protrusion portions may be provided and symmetrically disposed based on a virtual central axis of the fixture body.

An upper end of the protrusion portion may be formed in an obliquely inclined shape so that an inner diameter of the abutment insertion groove is increased toward an upper side.

A longitudinal length of the protrusion portion may be smaller than a longitudinal length of the abutment rotation stopping portion.

A length of the groove portion in the circumferential direction of the fixture body may be larger than a length of one side of an octagonal shape formed by the inner wall of the abutment rotation stopping portion.

Four groove portions may be provided and symmetrically disposed based on a virtual central axis of the fixture body.

The fixture body may include tapered portion which is disposed in an upper region of the abutment rotation stopping portion and provided so that the inner wall is tapered so that an inner diameter of the abutment insertion groove is gradually decreased toward the lower end of the fixture body from the upper end of the fixture body, and the tool coupling portion may include a tool coupling groove portion which is provided in the tapered portion and recessed by a predetermined depth toward the outer wall of the fixture body in the inner wall of the tapered portion.

A length of the tool coupling groove portion in the circumferential direction of the fixture body may be smaller than a length of one side of an octagonal shape formed by the inner wall of the abutment rotation stopping portion.

A height of a side wall forming the tool coupling groove portion may be increased downward.

Eight tool coupling groove portions may be provided and symmetrically disposed based on a virtual central axis of the fixture body.

The fixture body may further include an abutment support portion which is connected to the abutment rotation stopping portion, disposed in a lower region of the abutment rotation stopping portion, and supports the abutment.

The fixture body may further include a screw fastening portion which is connected to the abutment support portion, disposed in the lower region of the abutment rotation stopping portion, and provided with a screw groove which is formed in a longitudinal direction of the fixture body on the bottom of the abutment support portion to be fastened with an abutment screw coupling the abutment to the fixture body.

In order to sufficiently appreciate the present invention, operational advantages of the present invention, objects achieved by exemplary embodiments of the present invention, accompanying drawings illustrating the exemplary embodiments of the present invention and contents disclosed in the accompanying drawings should be referred.

Hereinafter, preferred exemplary embodiments of the present invention will be described in detail with reference to the accompanying drawings. However in description of the present invention, the description for known functions or configurations will be omitted in order to clarify the gist of the present invention.

Figure 2:
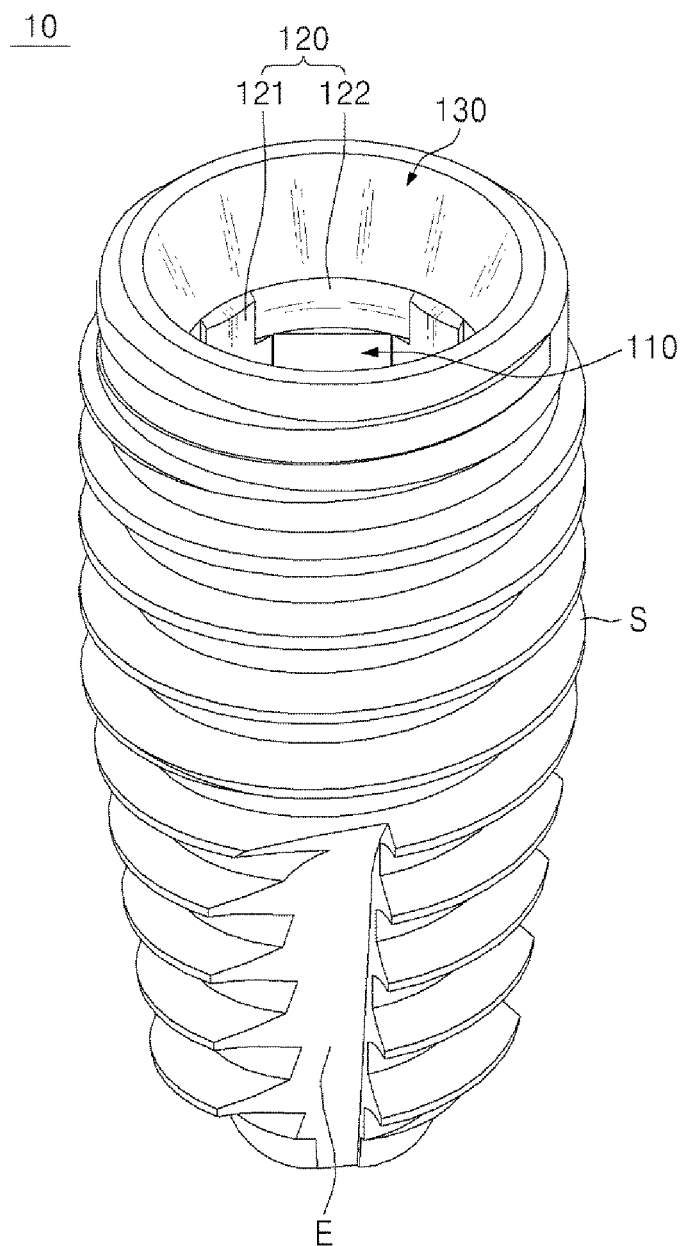
FIG. 2 is a diagram illustrating the fixture of the dental implant of FIG. 1.
Figure 3:
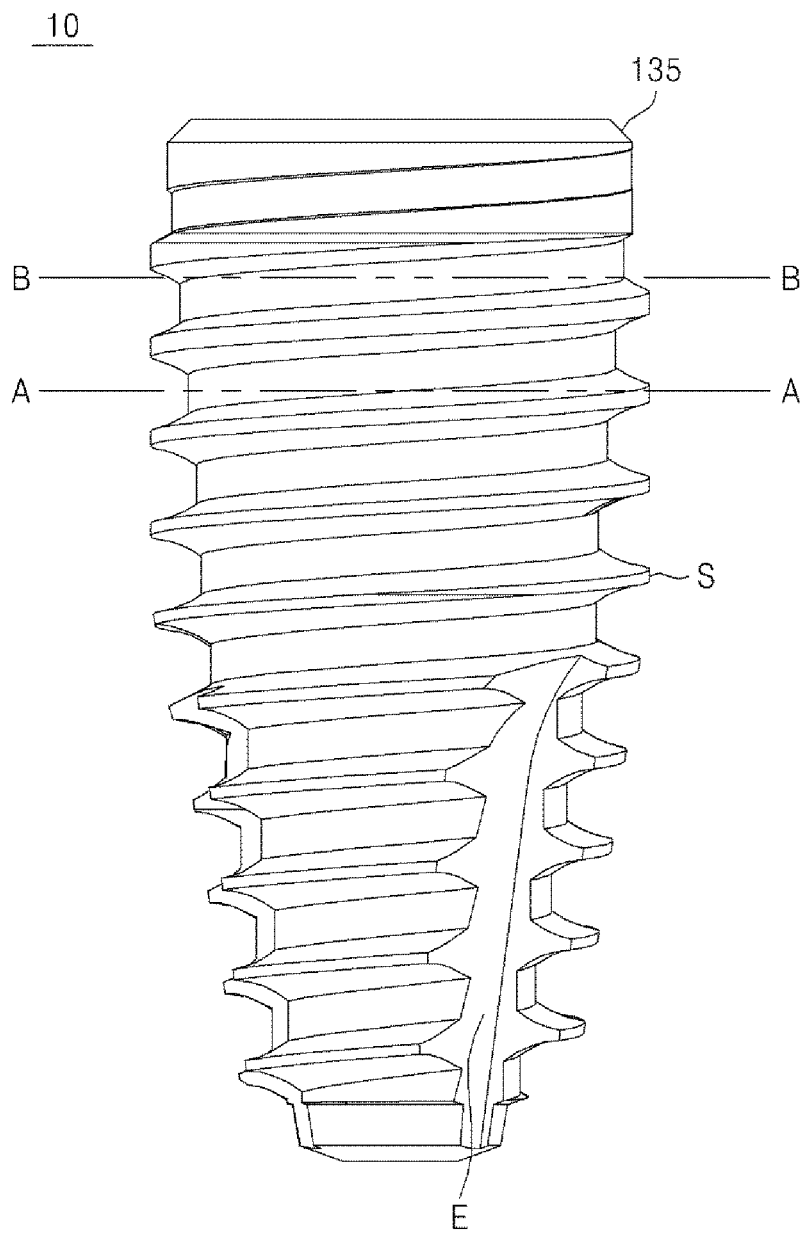
FIG. 3 is a front view of FIG. 2.
Figure 4:
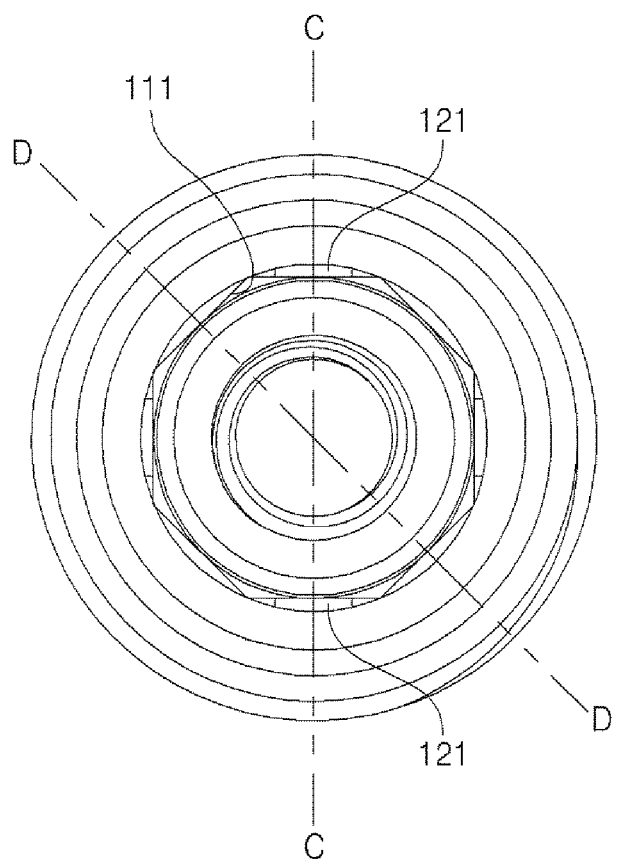
FIG. 4 is a plan view of FIG. 2.
Figure 5:
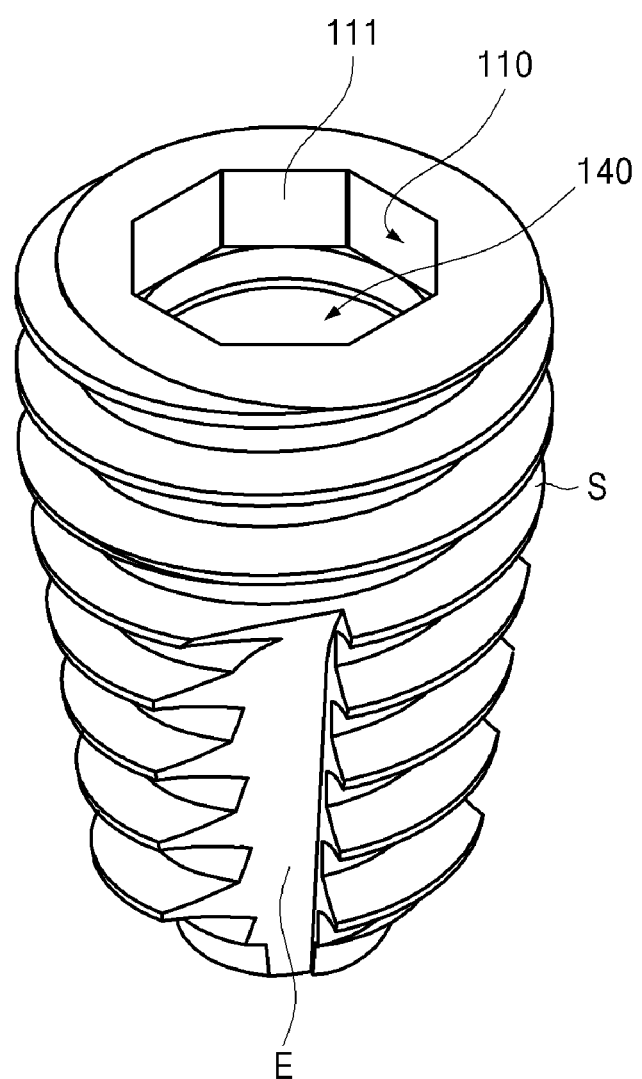
FIG. 5 is a cross-sectional view taken along line A-A of FIG. 3.
Figure 6:
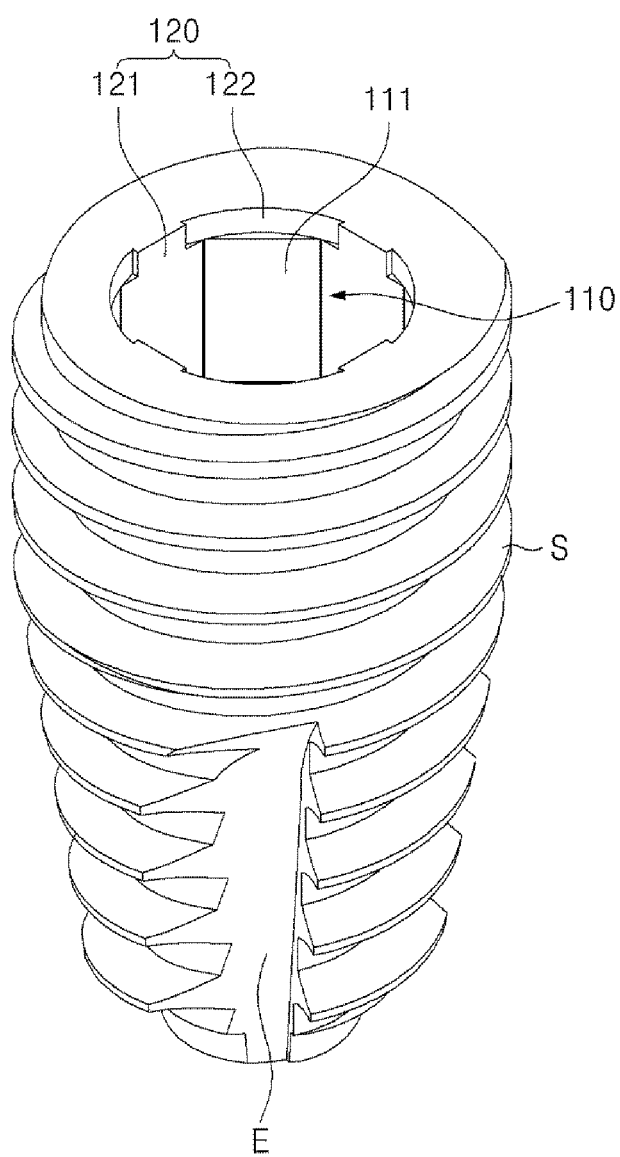
FIG. 6 is a cross-sectional view taken along line B-B of FIG. 3.
Figure 7:
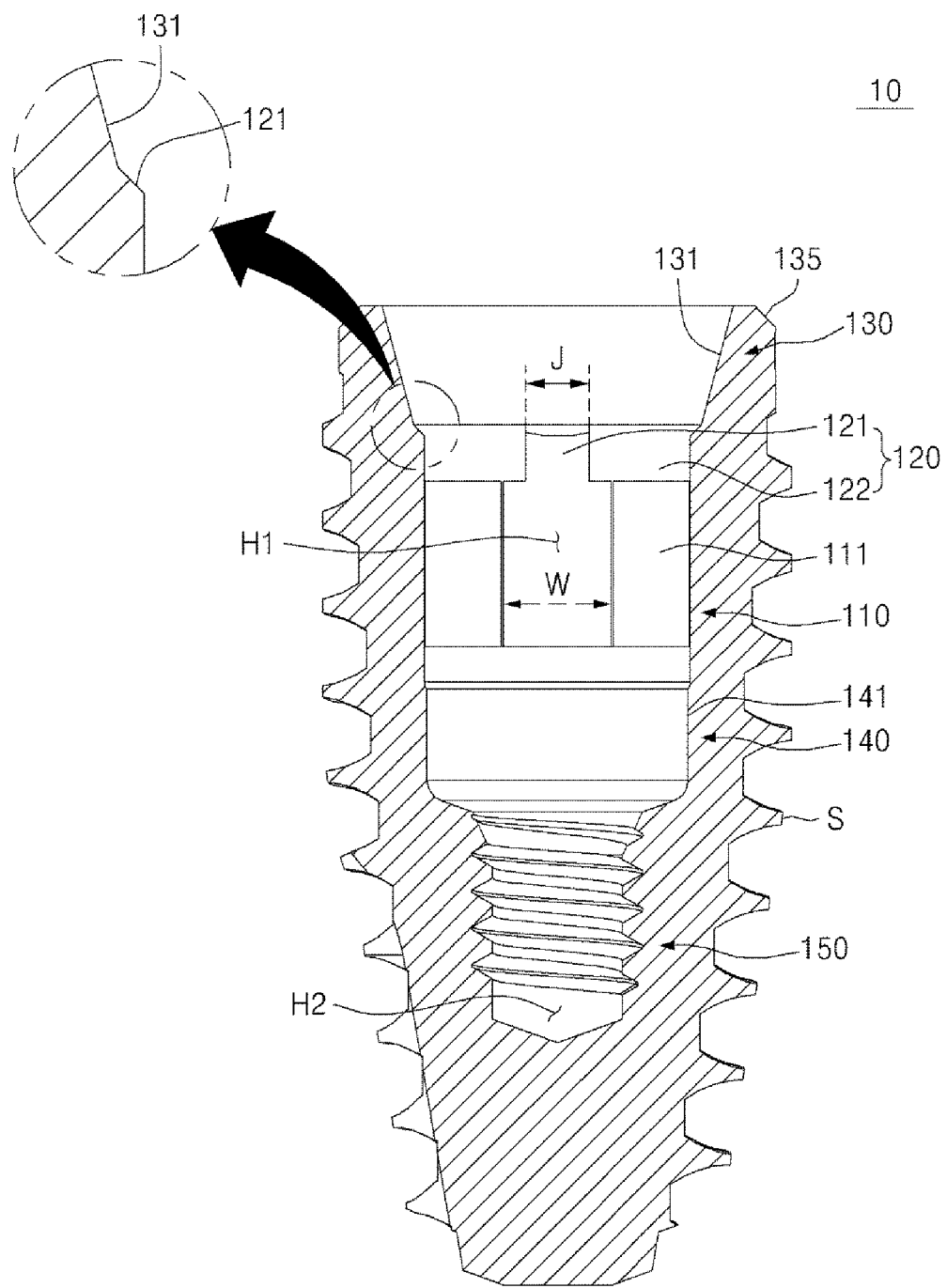
FIG. 7 is a cross-sectional view taken along line C-C of FIG. 4.
Figure 8:
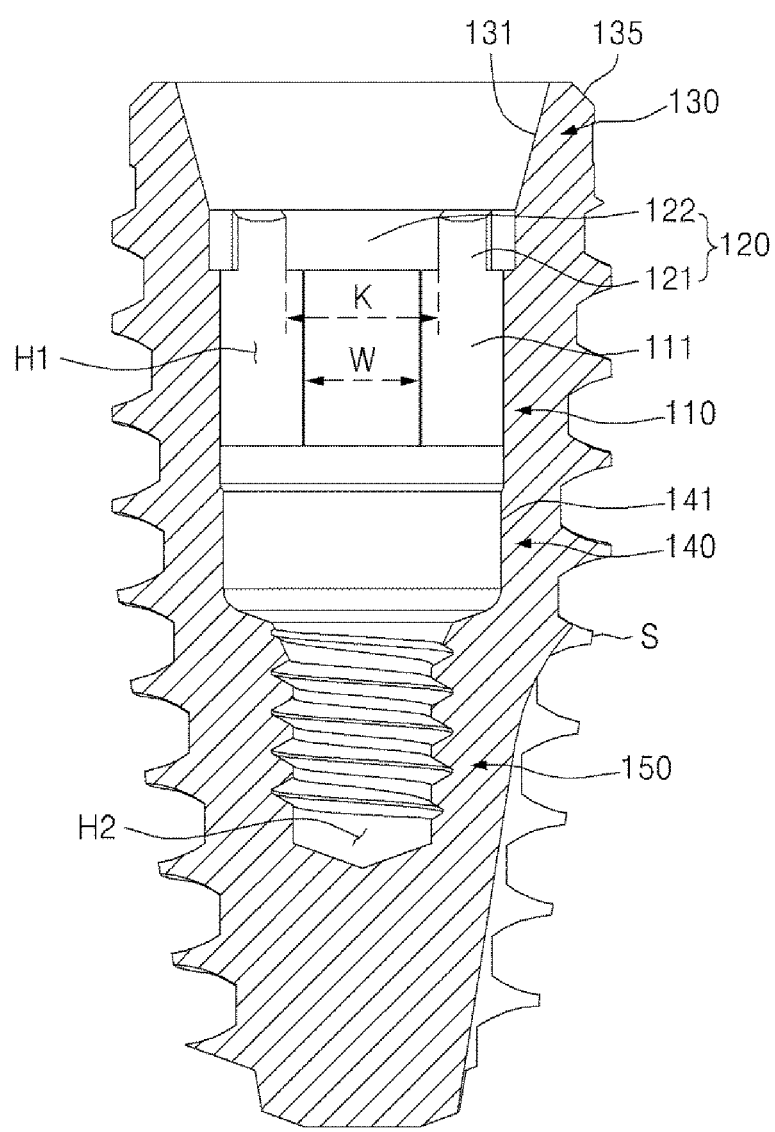
FIG. 8 is a cross-sectional view taken along line D-D of FIG. 4.

FIG. 1 is a diagram schematically illustrating a process of placing a fixture of a dental implant according to a first embodiment of the present invention, FIG. 2 is a diagram illustrating the fixture of the dental implant of FIG. 1, FIG. 3 is a front view of FIG. 2, FIG. 4 is a plan view of FIG. 2, FIG. 5 is a cross-sectional view taken along line A-A of FIG. 3, FIG. 6 is a cross-sectional view taken along line B-B of FIG. 3, FIG. 7 is a cross-sectional view taken along line C-C of FIG. 4, and FIG. 8 is a cross-sectional view taken along line D-D of FIG. 4.

As illustrated in FIG. 1, a large number of teeth 1 are arranged in the gum 3. The teeth 1 are a primary digesting means which crushes the food to deliver the crushed food into the stomach and may vary from person to person, but usually has about 28 numbers.

When one of these teeth 1 is lost (when the posterior tooth is missed), the lost tooth 1 is not only deteriorated in esthetics but also very inconvenient for chewing food.

A fixture body 10 is placed as a means for replacing a tooth root 2 of the tooth 1 on the gum 3 of the lost tooth 1. Although not illustrated in detail in FIG. 1, the fixture body 10 is placed into an alveolar bone (not illustrated) in the gum 3, and a drilling operation is preceded for the placement of the fixture body 10 before the fixture body 10 is placed. That is, a drilled groove G is processed at a predetermined position of the alveolar bone (not illustrated).

The fixture body 10 may be made of titanium (Ti) or a titanium (Ti) alloy without an adverse reaction to the human body.

For reference, the fixture body 10 of the present embodiment to be described below may be used in an initial implant procedure, or may be used for emergency when being placed directly into the alveolar bone (not illustrated) without replenishing a predetermined bone replacement material in a damaged portion during a procedure failure.

The fixture body 10 is provided with an abutment insertion groove H1 (see FIG. 7) which is recessed in a longitudinal direction at the upper end to be inserted with the abutment (not illustrated). When describing the structure of the fixture body 10 according to the present embodiment, as illustrated in FIGS. 2 to 8, the fixture body 10 according to the present embodiment includes an abutment rotation stopping portion 110 which stops a relative rotation to the fixture body 10 of the abutment (not illustrated), a tool coupling portion 120 which is disposed adjacently to the abutment rotation stopping portion 110 in an upper region of the abutment rotation stopping portion 110, a tapered portion 130 disposed in the upper region of the tool coupling portion 120, an abutment support portion 140 disposed in a lower region of the abutment rotation stopping portion 110, and a screw fastening portion 150 disposed in a lower region of the abutment support portion 140.

The abutment rotation stopping portion 110 is provided in shape in which an inner wall 111 forming the abutment insertion groove H1 is shape-fitted to the outer wall of the abutment (not illustrated). The abutment rotation stopping portion 110 stops the abutment (not illustrated) inserted into the abutment insertion groove H1 to relatively rotate to the fixture body 10.

The inner wall 111 of the abutment rotation stopping portion 110 is formed in a polygonal shape in a circumferential direction of the fixture body 10, and in the present embodiment, the inner wall 111 of the abutment rotation stopping portion 110 is formed in an octagonal shape in the circumferential direction of the fixture body 10 as illustrated in detail in FIG. 5.

As such, the inner wall 111 of the abutment rotation stopping portion 110 is formed in an octagonal shape, and a length of one side forming the octagonal shape is smaller than that of one side of a conventional hexagonal shape. Accordingly, a spacing between the inner wall 111 of the abutment rotation stopping portion 110 and the outer wall of the abutment (not illustrated) is further minimized to prevent shaking of the abutment (not illustrated) coupled to the fixture body 10.

The tool coupling portion 120 is connected to the abutment rotation stopping portion 110 and disposed adjacently to the abutment rotation stopping portion 110 in the upper area of the abutment rotation stopping portion 110. A rotary tool (not illustrated) rotating the fixture body 10 is detachably coupled to the tool coupling portion 120. In the present embodiment, a dental handpiece is used as the rotary tool (not illustrated), and the scope of the present invention is not limited thereto, and various tools which are placed into the alveolar bone (not illustrated) by rotating the fixture body 10 may be used as the rotary tool (not illustrated) of the present embodiment.

As such, in the present embodiment, the rotary tool (not illustrated) is coupled to the tool coupling portion 120 which is spatially separated from the abutment rotation stopping portion 110 so that the shape of the abutment rotation stopping portion 110 is not influenced by the shape of the rotary tool (not illustrated). Unlike the related art, the shape of the inner wall 111 of the abutment rotation stopping portion 110 may be changed to a shape (an octagonal shape of the present embodiment) which may be brought into close contact with the outer wall of the abutment (not illustrated).

As described above, the fixture body 10 according to the present embodiment receives a torque that rotates the fixture body 10 through the tool coupling portion 120 spatially separated from the abutment rotation stopping portion 110. As a result, unlike the related art, the torque transmission of the rotary tool (not illustrated) is not influenced by the shape of the abutment rotation stopping portion 110 so that the torque of the rotary tool (not illustrated) may be effectively transmitted to the fixture body 10 in the placement of the fixture body 10.

In the present embodiment, as illustrated in detail in FIG. 6, the tool coupling portion 120 includes a protrusion portion 121 extended upward from an edge region of the inner wall 111 of the abutment rotation stopping portion 110 by a predetermined length, and a groove portion 122 which is connected to the protrusion portion 121 and recessed by a predetermined depth in an outer wall direction of the fixture body 10 at the inner wall of the protrusion portion.

In the present embodiment, the protrusion portion 121 and the groove portion 122 constitute a part of the inner wall of the abutment insertion groove H1. The groove portion 122 is formed so that a part of the rotary tool (not illustrated) is insertable and the protrusion portion 121 supports a part of the rotary tool (not illustrated) inserted into the groove portion 122 in the circumferential direction to prevent the rotary tool (not illustrated) from slipping in the abutment insertion groove H1, so that the torque of the rotary tool (not illustrated) is effectively transmitted to the fixture body 10 during the placement of the fixture body 10.

When describing the structure of the protrusion portion 121 described above in detail, the protrusion portion 121 is extended upward from the edge region of the inner wall 111 of the abutment rotation stopping portion 110 by a predetermined length. The inner wall of the protrusion portion 121 forms the same plane as the inner wall 111 of the abutment rotation stopping portion 110 as illustrated in detail in FIG. 6.

An upper end of the protrusion portion 121 is formed in an obliquely inclined shape as illustrated in detail in FIG. 7. That is, the upper end of the protrusion portion 121 is formed in an obliquely inclined shape so that an inner diameter of the abutment insertion groove H1 is increased toward the upper side.

As such, the upper end of the protrusion portion 121 of the present embodiment is formed in an obliquely inclined shape so that an inner diameter of the abutment insertion groove H1 is increased toward the upper side, thereby naturally inducing the descending of the abutment (not illustrated) in the insertion of the abutment (not illustrated).

A circumferential length J of the protrusion portion 121 is smaller than a length W of one side of the inner wall 111 of the abutment rotation stopping portion 110. That is, as illustrated in detail in FIG. 7, a circumferential length J of the protrusion portion 121 in the circumferential direction of the fixture body 10 is smaller than a length W of one side of an octagonal shape formed by the inner wall 111 of the abutment rotation stopping portion 110. The circumferential length J of the protrusion portion 121 induces the shape of the groove portion 122 having a relatively long length K (see FIG. 8).

Also, as illustrated in detail in FIGS. 7 and 8, a longitudinal length of the protrusion portion 121 is provided to be smaller than the longitudinal length of the abutment rotation stopping portion 110.

A plurality of protrusion portions 121 is provided and symmetrically disposed based on a virtual central axis (not illustrated) of the fixture body 10. As illustrated in detail in FIG. 6, in the present embodiment, four protrusion portions 121 are provided, and the scope of the present invention is not limited thereto, and the protrusion portion 121 of the present embodiment may be provided with various numbers.

The groove portion 122 is connected to the protrusion portion 121. The groove portion 122 is recessed by the predetermined depth in the outer wall direction of the fixture body 10 at the inner wall of the protrusion portion 121.

In the present embodiment, as illustrated in detail in FIG. 6, the groove portion 122 is elongated in a circumferential direction of the fixture body 10. In the present embodiment, a length K of the groove portion 122 in the circumferential direction of the fixture body 10 is larger than a length W of one side of an octagonal shape formed by the inner wall 111 of the abutment rotation stopping portion 110.

As such, the groove portion 122 of the present embodiment is elongated in the circumferential direction of the fixture body 10 to stably support the rotary tool (not illustrated) during the coupling of the rotary tool (not illustrated).

A plurality of groove portions 122 is provided and symmetrically disposed based on a virtual central axis (not illustrated) of the fixture body 10. As illustrated in detail in FIG. 6, in the present embodiment, four groove portions 122 are provided, and the scope of the present invention is not limited thereto, and the groove portions 122 of the present embodiment may be provided with various numbers.

Meanwhile, the tapered portion 130 is disposed in the upper region of the tool coupling portion 120. As illustrated in detail in FIGS. 7 and 8, in such a tapered portion 130, an inner wall 131 forms the abutment insertion groove H1 and the inner wall 131 is tapered so that a diameter of the abutment insertion groove H1 is gradually decreased toward the lower end of the fixture body 10 from the upper end of the fixture body 10.

An inclined angle of the inner wall 131 of the tapered portion 130 may have a range of 2° to 6° and a portion of the abutment (not illustrated) being in contact with the inner wall 131 of the tapered portion 130 is inclined at the same angle as the inclined angle of the inner wall 131 of the tapered portion 130. Accordingly, the abutment (not illustrated) inserted into the abutment insertion groove H1 may be brought into close contact with the fixture body 10.

In an outer region of the upper end of the fixture body 10, a rounded bevel portion 135 is provided. The bevel portion 135 is a portion where the upper surfaces of the fixture body 10 and the alveolar bone (not illustrated) come into contact with each other when the abutment (not illustrated) is coupled to the fixture body 10 and serves to provide strong fixing force due to a contact in a larger area by increasing a contact area with the alveolar bone (not illustrated).

The bevel portion 135 is formed in a round shape having no edged portion in which an outer surface is rounded to reduce a load applied to the alveolar bone (not illustrated) during the placement of the fixture body 10, thereby reducing a bone loss.

Meanwhile, as illustrated in detail in FIGS. 7 and 8, a maximum diameter of the bevel portion 135 is smaller than that of a screw portion S. As a result, during the placement of the fixture body 10, it is possible to reduce a load applied to the alveolar bone (not illustrated) and reduce the bone loss, and a separate placement mechanism for the bevel portion 135 is not required.

Meanwhile, in the present embodiment, the bevel portion 135 is anodized to provide a much better effect than existing products in terms of strength and abrasion resistance. In addition, by anodizing, the bevel portion 135 may obtain coloring and smooth surface effects and has an excellent aesthetical effect.

The anodizing will be briefly described. When a metal (component) is placed on an anode and electrolyzed in a dilute-acid solution, an oxide film (aluminum oxide: Al2O3) having a great adhesion with a base metal is formed by oxygen generated in the anode. The anodic oxidation is anodizing, a compound word of anode and oxidizing. In electroplating, there is a difference from plating when a component is applied on a cathode. The most representative material of anodic oxidation is Al, and anodizing is also performed on metal materials such as Mg, Zn, Ti, Ta, Hf and Nb. In recent years, the anodizing treatment on magnesium and titanium materials is also increasingly used.

Meanwhile, the abutment support portion 140 is disposed in the lower region of the abutment rotation stopping portion 110 to be connected to the abutment rotation stopping portion 110. The inner wall 141 of the abutment support portion 140 supports the abutment (not illustrated).

In the present embodiment, the inner wall 141 of the abutment support portion 140 forms the abutment insertion groove H1 and is formed in a circular shape in the circumferential direction of the fixture body 10 unlike the abutment rotation stopping portion 110.

As such, the inner wall 141 of the abutment support portion 140 of the present embodiment is formed in a circular shape to minimize a spacing between the inner wall 141 of the abutment support portion 140 and the outer wall of the abutment (not illustrated), thereby preventing shaking of the abutment (not illustrated) coupled to the fixture body 10.

Meanwhile, the screw fastening portion 150 is disposed in the lower region of the abutment support portion 140 to be connected to the abutment support portion 140. The screw fastening portion 150 is provided with a screw groove H2 which is formed in a longitudinal direction of the fixture body 10 on the bottom of the abutment support portion 140 and fastened with an abutment screw (not illustrated) coupling the abutment (not illustrated) to the fixture body 10.

The screw groove H2 is a portion which is fastened with the abutment screw (not illustrated) passing through a through hole (not illustrated) provided in the abutment (not illustrated).

Meanwhile, as illustrated in detail in FIGS. 2 to 8, the fixture body 10 of the present embodiment is formed in a tapered shape so that a diameter gradually decreases in a direction in which at least a part of the outer wall is placed.

As described above, the fixture body 10 according to the present embodiment is formed in a tapered shape in which the diameter of the outer wall gradually decreases in the placed direction to be stably formed in a similar structure to natural teeth and suppress bone heating generated during placement, thereby facilitating the placement and increasing the initial fixing force.

Meanwhile, in the fixture body 10 of the present embodiment, the screw portion S formed in a spiral shape along the outer wall is provided. Such a screw portion S is fastened to a female screw portion (not illustrated) formed on the alveolar bone (not illustrated) to firmly fix the fixture body 10 to the alveolar bone (not illustrated).

Further, in the fixture body 10 of the present embodiment, a cutting edge E formed in a circumferential direction is provided. The cutting edge E forms a sharp front end to more facilitate the placement of the fixture body 10.

Referring to FIGS. 2 to 8, the cutting edge E of the present embodiment is provided to have a groove shape having a circular cut cross section. However, when the cutting edge E is provided in a straight groove shape, the sharp front end is embossed to increase a resistance force at the time of placing the alveolar bone (not illustrated), and the shape of the screw portion S is decreased to reduce the surface area, and thus a coupling force to the alveolar bone (not illustrated) is lowered.

Like the present embodiment, the cutting edge E formed in the groove shape enlarges the surface area of the screw portion S to improve the coupling force at the time of placing the fixture body 10, thereby enhancing an initial fixing force.

In the present embodiment, three cutting edges E are provided at equal intervals along the circumferential direction of the fixture body 10, and the scope of the present invention is not limited thereto, and if necessary, the number of cutting edges E may not be added or subtracted.

Hereinafter, an operation of the fixture body 10 of the dental implant of the present embodiment will be described with reference to FIGS. 1 to 8.

First, when describing a process of placing the fixture body 10 to the alveolar bone (not illustrated), the rotary tool (not illustrated) is coupled to the tool coupling portion 120 located in the upper region of the abutment rotation stopping portion 110 and then the fixture body 10 is placed into the drilled hole G illustrated in FIG. 1.

At this time, the groove portion 122 is inserted with a part of the rotary tool (not illustrated) and the protrusion portion 121 supports a part of the rotary tool (not illustrated) inserted into the groove portion 122 in the circumferential direction to prevent the rotary tool (not illustrated) from slipping in the abutment insertion groove H1, so that the torque of the rotary tool (not illustrated) is effectively transmitted to the fixture body 10 during the placement of the fixture body 10.

Thereafter, the abutment (not illustrated) is inserted into the abutment insertion groove H1. At this time, the inner wall 111 of the abutment rotation stopping portion 110 is shape-fitted to the outer wall of the abutment (not illustrated) so that the relative rotation to the fixture body 10 of the abutment (not illustrated) is stopped.

In the present embodiment, the inner wall 111 of the abutment rotation stopping portion 110 and the outer wall of the abutment (not illustrated) are formed in octagonal shapes to be brought into close contact with each other so as to have almost no spacing as compared with a case where the inner wall 111 of the abutment rotation stopping portion 110 and the outer wall of the abutment (not illustrated) are formed in a hexagonal shape in the related art. As such, the inner wall 111 of the abutment rotation stopping portion 110 is brought into close contact with the outer wall of the abutment (not illustrated) to prevent shaking of the abutment (not illustrated) coupled to the fixture body 10.

According to the present embodiment, the fixture body 10 of the dental implant includes the tool coupling portion 120 which is disposed in the upper region of the abutment rotation stopping portion 110 in a shape in which the inner wall 111 is shape-fitted to the outer wall of the abutment (not illustrated) and detachably coupled with the rotary tool (not illustrated) rotating the fixture body 10. As a result, the shape of the abutment rotation stopping portion 110 is not influenced by the shape of the rotary tool (not illustrated) so that the shape of the inner wall 111 of the abutment rotation stopping portion 110 may be brought into close contact with the outer wall of the abutment (not illustrated). Therefore, it is possible to effectively receive the torque of the rotary tool (not illustrated) at the time of placing the fixture body 10 while preventing shaking of the abutment (not illustrated) coupled to the fixture body 10.

Figure 9:
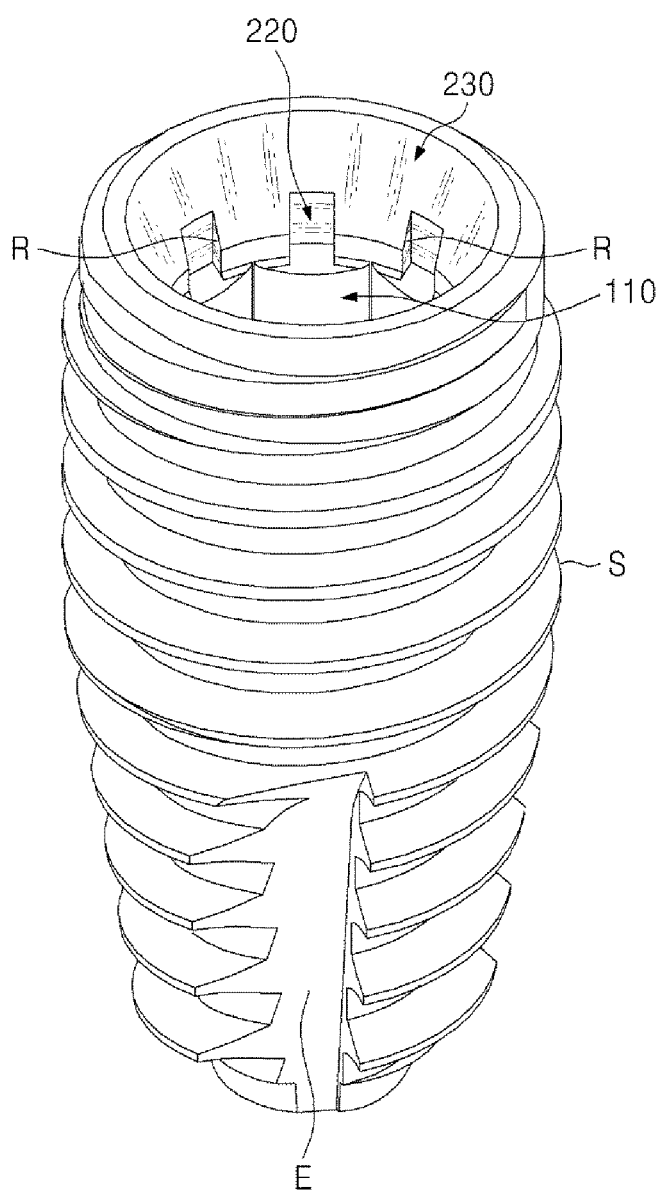
FIG. 9 is a diagram illustrating a dental implant according to a second embodiment of the present invention.
Figure 10:
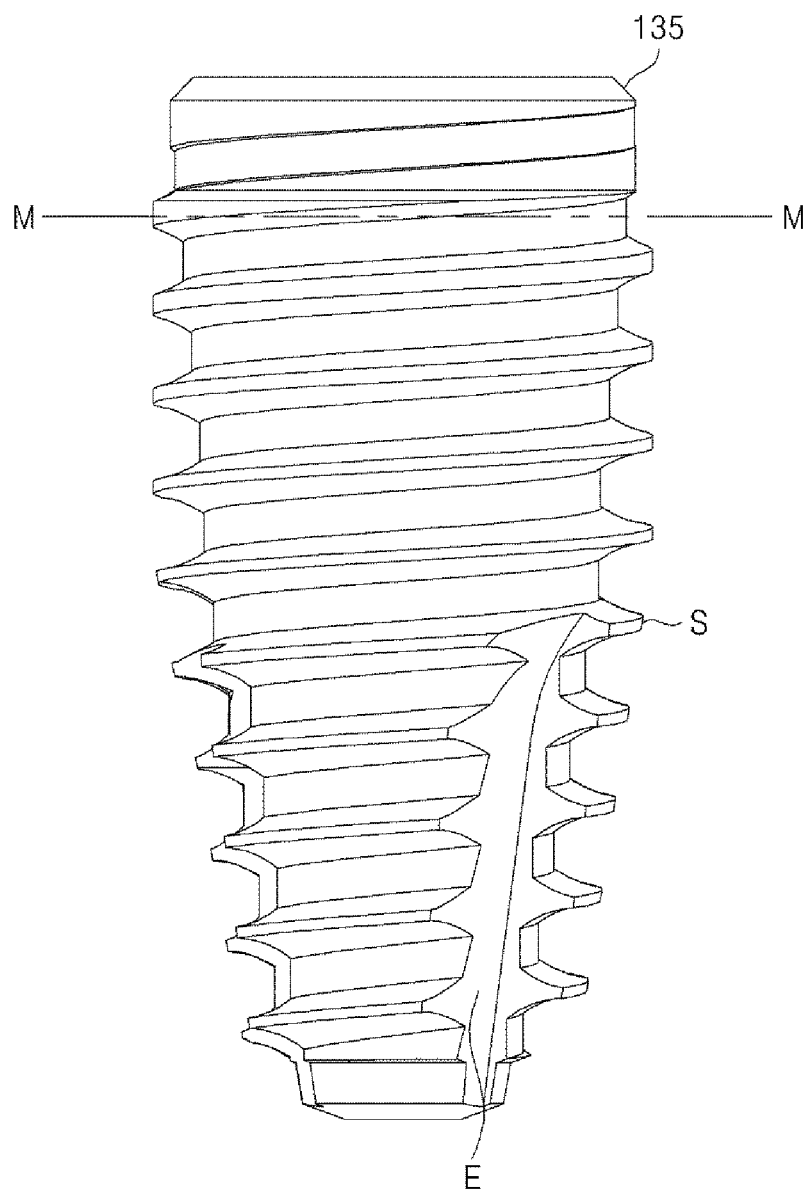
FIG. 10 is a front view of FIG. 9.
Figure 11:
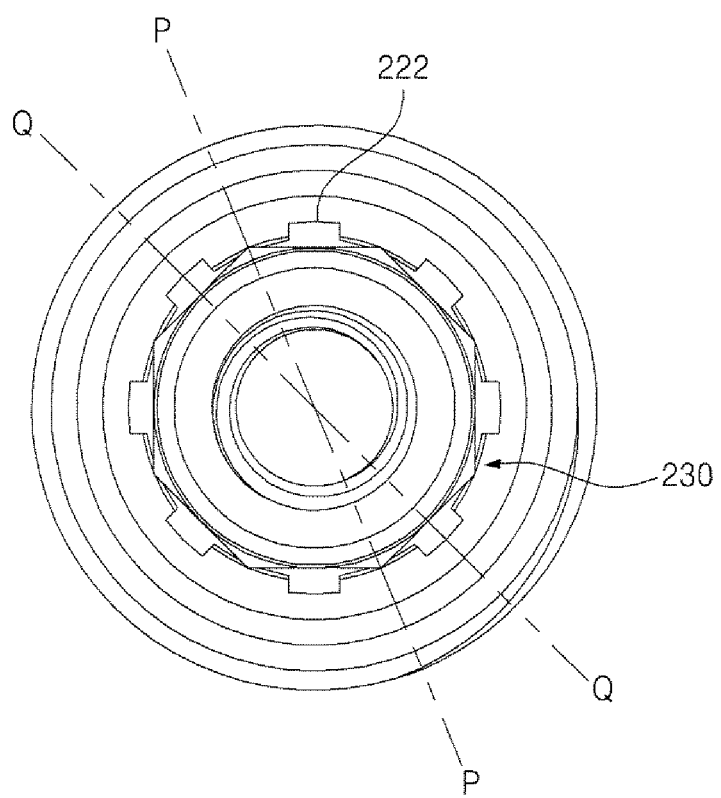
FIG. 11 is a plan view of FIG. 9.
Figure 12:
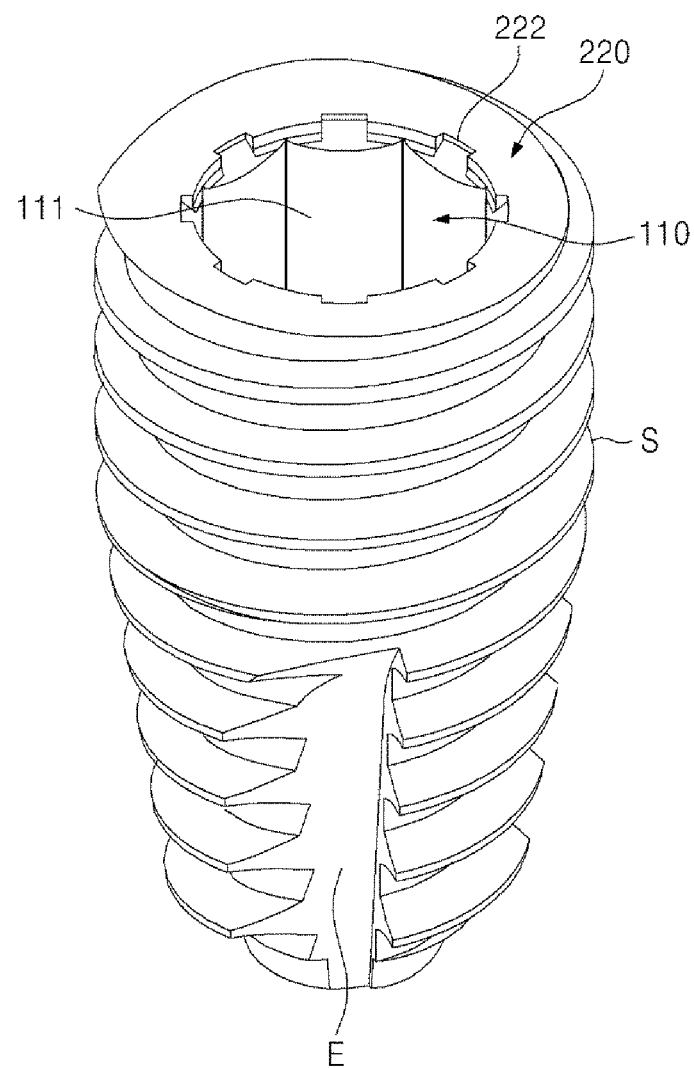
FIG. 12 is a cross-sectional view taken along line M-M of FIG. 10.
Figure 13:
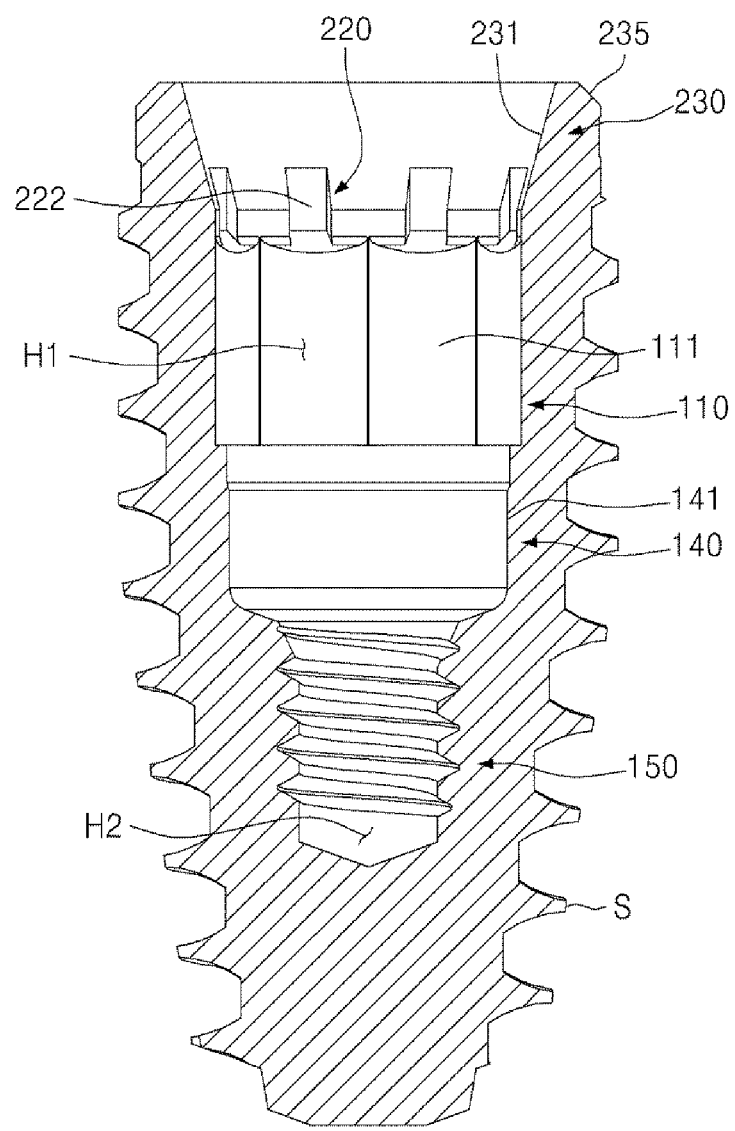
FIG. 13 is a cross-sectional view taken along line P-P of FIG. 11.
Figure 14:
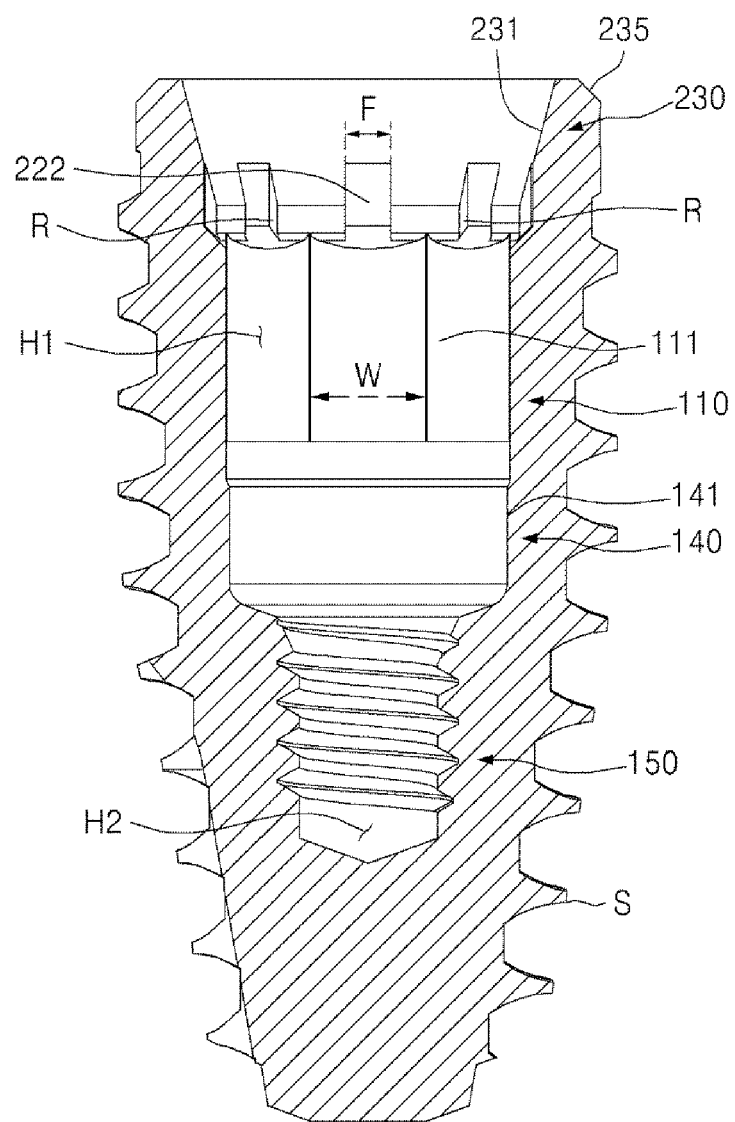
FIG. 14 is a cross-sectional view taken along line Q-Q of FIG. 11.

FIG. 9 is a diagram illustrating a dental implant according to a second embodiment of the present invention, FIG. 10 is a front view of FIG. 9, FIG. 11 is a plan view of FIG. 9, FIG. 12 is a cross-sectional view taken along line M-M of FIG. 10, FIG. 13 is a cross-sectional view taken along line P-P of FIG. 11, and FIG. 14 is a cross-sectional view taken along line Q-Q of FIG. 11.

The present embodiment is different from the first embodiment only in that a tool coupling portion 220 is provided in a tapered portion 230, but other configurations are the same as those of the first embodiment of FIGS. 1 to 8, and thus hereinafter the same configurations use the same reference numerals and the description thereof will be omitted.

As illustrated in FIGS. 9 to 14, the tapered portion 230 of the present embodiment is disposed in the upper region of an abutment rotation stopping portion 210 and a tool coupling portion 220 is provided in the tapered portion 230.

In the present embodiment, the tool coupling portion 220 includes a tool coupling groove portion 222 which is recessed by a predetermined depth toward an outer wall of a fixture body 20 in an inner wall 231 of the tapered portion 230.

In the present embodiment, the tool coupling groove portion 222 is formed so that a part of the rotary tool (not illustrated) is insertable and a side wall of the tool coupling groove portion 222 supports a part of the rotary tool (not illustrated) inserted into the tool coupling groove portion 222 in the circumferential direction to prevent the rotary tool (not illustrated) from slipping in the abutment insertion groove H1, so that the torque of the rotary tool (not illustrated) is effectively transmitted to the fixture body 20 during the placement of the fixture body 20.

A length F between both side walls of the tool coupling groove portion 222 is smaller than a length W of one side of an inner wall 211 of the abutment rotation stopping portion 210. That is, as illustrated in detail in FIG. 14, a length F of the tool coupling groove portion 222 in the circumferential direction of the fixture body 20 is smaller than a length W of one side of an octagonal shape formed by the inner wall 211 of the abutment rotation stopping portion 210.

Further, in the present embodiment, the tool coupling groove portion 222 is formed in a direction of vertically cutting the tapered portion 230. Accordingly, as illustrated in FIGS. 9 to 14, a height of a side wall R forming the tool coupling groove portion 222 is increased downward.

A plurality of tool coupling groove portions 222 is provided and symmetrically disposed based on a virtual central axis (not illustrated) of the fixture body 20. As illustrated in detail in FIG. 12, in the present embodiment, eight tool coupling groove portions 222 are provided, and the scope of the present invention is not limited thereto, and the tool coupling groove portions 222 of the present embodiment may be provided with various numbers.

As such, the fixture body 20 of the dental implant according to the present embodiment has an advantage of maximizing space utilization by providing the tool coupling groove portions 222 in the tapered portion 230.

Although the present invention has been described in detail with reference to the above drawings, the scope of the present invention is not limited to the above-described drawings and description.

The present invention is not limited to the exemplary embodiments described herein, and it would be apparent to those skilled in the art that various changes and modifications might be made without departing from the spirit and the scope of the present invention. Therefore, it will be determined that the changed examples or modified examples are included in the appended claims of the present invention.

The present inventive concept may be used for the field of a dental implant surgery.

The invention claimed is:

1. A fixture of a dental implant comprising:
   a fixture body in which a screw portion is formed in a spiral shape along an outer wall and an abutment insertion groove inserted with an abutment is recessed in a longitudinal direction at an upper end;
   an abutment rotation stopping portion provided in the fixture body, the abutment rotation stopping portion is formed in a shape in which at least a part of an inner wall of the fixture body is shape-fitted to an outer wall of the abutment and is configured to stop a relative rotation to the fixture body of the abutment; and
   a tool coupling portion which is provided in the fixture body, is separate in height in the fixture body from the abutment rotation stopping portion, and is located above the abutment rotation stopping portion within the insertion groove, the tool coupling portion is configured to detachably couple with a rotary tool for rotating the fixture body,
   wherein the tool coupling portion includes
      a protrusion portion which is disposed in an upper region of the inner wall of the abutment rotation stopping portion and coupled with the rotary tool when the rotary tool engages the fixture and is rotated, and
      a groove portion which is connected to the protrusion portion and recessed by a predetermined depth toward the outer wall of the fixture body in the inner wall of the protrusion portion, the groove portion abuts against the abutment rotation stopping portion,
   wherein a length of the protrusion portion in the perimeter of the circumferential direction of the fixture is smaller than a length of one side of an octagonal shape formed by the inner wall of the abutment rotation stopping portion,
   wherein the protrusion portion is provided on the upper side of at least one of the octagonal sides formed by the inner wall of the abutment rotation stopping portion,
   wherein the inner wall of the abutment rotation stopping portion is formed in the octagonal shape in a circumferential direction of the fixture body,
   wherein four protrusion portions are provided and symmetrically disposed based on a virtual central axis of the fixture body,
   wherein a length of the groove portion in the perimeter of the circumferential direction of the fixture is larger than a length of one side of an octagonal shape formed by the inner wall of the abutment rotation stopping portion,
   wherein the side wall of the protrusion portion and the inner wall of the groove portion intersect at a predetermined angle.

2. The fixture of the dental implant of claim 1, wherein an upper end of the protrusion portion is formed in an obliquely inclined shape so that an inner diameter of the abutment insertion groove is increased toward an upper side.

3. The fixture of the dental implant of claim 1, wherein a longitudinal length of the protrusion portion is smaller than a longitudinal length of the abutment rotation stopping portion.

4. The fixture of the dental implant of claim 1, wherein four groove portions are provided and symmetrically disposed based on a virtual central axis of the fixture body.

5. The fixture of the dental implant of claim 1, wherein the fixture body further includes an abutment support portion which is connected to the abutment rotation stopping portion, disposed in a lower region of the abutment rotation stopping portion, and supports the abutment.

6. The fixture of the dental implant of claim 5, wherein the fixture body further includes a screw fastening portion which is connected to the abutment support portion, disposed in the lower region of the abutment rotation stopping portion, and provided with a screw groove which is formed in a longitudinal direction of the fixture body on a bottom of the abutment support portion to be fastened with an abutment screw coupling the abutment to the fixture body.

* * * * *